(12) United States Patent
Adachi et al.

(10) Patent No.: US 11,560,217 B2
(45) Date of Patent: Jan. 24, 2023

(54) AIRCRAFT LANDING ASSIST APPARATUS, AIRCRAFT LANDING ASSIST METHOD, AND NON-TRANSITORY STORAGE MEDIUM

(71) Applicant: SUBARU CORPORATION, Tokyo (JP)

(72) Inventors: Norihiko Adachi, Tokyo (JP); Yukinobu Tomonaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 811 days.

(21) Appl. No.: 16/452,167

(22) Filed: Jun. 25, 2019

(65) Prior Publication Data

US 2020/0094948 A1    Mar. 26, 2020

(30) Foreign Application Priority Data

Sep. 21, 2018  (JP) .............................. JP2018-176880

(51) Int. Cl.
*B64C 25/00* (2006.01)
*B64D 47/02* (2006.01)
(Continued)

(52) U.S. Cl.
CPC ............ *B64C 25/001* (2013.01); *B64D 47/02* (2013.01); *B64D 47/08* (2013.01); *G08G 5/0086* (2013.01); *G08G 5/0091* (2013.01); *G08G 5/025* (2013.01); *B64C 29/0091* (2013.01); *B64C 2201/18* (2013.01)

(58) Field of Classification Search
CPC .............. B64C 25/001; B64C 29/0091; B64C 2201/18; B64D 47/02; B64D 47/08; G08G 5/0086; G08G 5/0091; G08G 5/025

See application file for complete search history.

(56) References Cited

U.S. PATENT DOCUMENTS 8,976,042 B1 * 3/2015 Chiew ................... G06T 15/405
                                                                701/14
2014/0350754 A1 * 11/2014 Elgersma ............... G08G 5/025
                                                                701/16

(Continued)

FOREIGN PATENT DOCUMENTS

EP    3 043 332 A1   7/2016
JP    6176717 B2     8/2017

*Primary Examiner* — Peter D Nolan
*Assistant Examiner* — Demetra R Smith-Stewart
(74) *Attorney, Agent, or Firm* — McDermott Will & Emery LLP

(57) ABSTRACT

An aircraft landing assist apparatus includes an image obtaining unit, a shape obtaining unit, a measuring unit, and a calculating unit. The image obtaining unit is configured to obtain an image of a surrounding region of a landing point on which an aircraft is to land. The shape obtaining unit is configured to obtain a shape of the surrounding region of the landing point on the basis of the obtained image. The measuring unit is configured to measure an above-air wind direction and an above-air wind velocity. The calculating unit is configured to calculate a landing-point wind direction and a landing-point wind velocity on the basis of the obtained shape of the surrounding region of the landing point, the measured above-air wind direction, and the measured above-air wind velocity.

17 Claims, 5 Drawing Sheets

(51) Int. Cl.
    *B64D 47/08*     (2006.01)
    *G08G 5/00*     (2006.01)
    *G08G 5/02*     (2006.01)
    *B64C 29/00*     (2006.01)

(56) References Cited

U.S. PATENT DOCUMENTS

| | | | |
|---|---|---|---|
| 2015/0129716 A1* | 5/2015 | Yoffe | B64F 1/0297 |
| | | | 244/110 C |
| 2015/0367956 A1* | 12/2015 | Loussides | B64D 45/04 |
| | | | 701/18 |
| 2019/0310661 A1* | 10/2019 | Rysdyk | G05D 1/0276 |

\* cited by examiner

AIRCRAFT LANDING ASSIST APPARATUS, AIRCRAFT LANDING ASSIST METHOD, AND NON-TRANSITORY STORAGE MEDIUM

CROSS-REFERENCE TO RELATED APPLICATIONS

The present application claims priority from Japanese Patent Application No. 2018-176880 filed on Sep. 21, 2018, the entire contents of which are hereby incorporated by reference.

BACKGROUND

The technology relates to a technique that assists safe landing by estimating a wind condition at a landing point.

An aircraft, such as a rotary-wing aircraft, may approach a landing point for landing in the condition in which the wind conditions around the landing point are poor due to surrounding constructions and a landform. In such cases, the aircraft can lose lift or control due to sudden entry to a windless zone or a strong-wind zone. Also in a case of approaching a flight deck of a ship for landing, the aircraft can lose control during normal operation because of facing an unexpected situation due to, for example, entry to a windless zone or a strong-wind zone, which is generated by a structure such as a hanger.

That is, to enable safe landing, it may be important to accurately know a wind condition at a landing point.

From this point of view, for example, a technique disclosed in Japanese Patent (JP-B) No. 6176717 uses past flight data to obtain data of a wind direction and a wind velocity in a specific landing route. This data of the wind direction and the wind velocity is used to estimate a degree of difficulty in landing.

SUMMARY

An aspect of the technology provides an aircraft landing assist apparatus that includes an image obtaining unit, a shape obtaining unit, a measuring unit, and a calculating unit. The image obtaining unit is configured to obtain an image of a surrounding region of a landing point. The surrounding region is a region around the landing point. The landing point is a point on which an aircraft is to land. The shape obtaining unit is configured to obtain a shape of the surrounding region of the landing point on the basis of the image obtained by the image obtaining unit. The measuring unit is configured to measure an above-air wind direction and an above-air wind velocity. The above-air wind direction is a wind direction in air above the landing point. The above-air wind velocity is a wind velocity in the air above the landing point. The calculating unit is configured to calculate a landing-point wind direction and a landing-point wind velocity on the basis of the shape, of the surrounding region of the landing point, obtained by the shape obtaining unit, the above-air wind direction measured by the measuring unit, and the above-air wind velocity measured by the measuring unit. The landing-point wind direction is a wind direction at the landing point. The landing-point wind velocity is a wind velocity at the landing point.

An aspect of the technology provides an aircraft landing assist method including: obtaining an image of a surrounding region of a landing point, the surrounding region being a region around the landing point, the landing point being a point on which an aircraft is to land; obtaining a shape of the surrounding region of the landing point on the basis of the obtained image; measuring an above-air wind direction and an above-air wind velocity, the above-air wind direction being a wind direction in air above the landing point, the above-air wind velocity being a wind velocity in the air above the landing point; and calculating a landing-point wind direction and a landing-point wind velocity on the basis of the obtained shape of the surrounding region of the landing point, the measured above-air wind direction, and the measured above-air wind velocity, the landing-point wind direction being a wind direction at the landing point, the landing-point wind velocity being a wind velocity at the landing point.

An aspect of the technology provides a non-transitory storage medium that includes an aircraft landing assist program embodied therein. The aircraft landing assist program causes, when executed by an information processor, the information processor to implement a method. The method includes: obtaining an image of a surrounding region of a landing point, the surrounding region being a region around the landing point, the landing point being a point on which an aircraft is to land; obtaining a shape of the surrounding region of the landing point on the basis of the obtained image; measuring an above-air wind direction and an above-air wind velocity, the above-air wind direction being a wind direction in air above the landing point, the above-air wind velocity being a wind velocity in the air above the landing point; and calculating a landing-point wind direction and a landing-point wind velocity on the basis of the obtained shape of the surrounding region of the landing point, the measured above-air wind direction, and the measured above-air wind velocity, the landing-point wind direction being a wind direction at the landing point, the landing-point wind velocity being a wind velocity at the landing point.

An aspect of the technology provides an aircraft landing assist apparatus that includes circuitry. The circuitry is configured to obtain an image of a surrounding region of a landing point. The surrounding region is a region around the landing point. The landing point is a point on which an aircraft is to land. The circuitry is configured to obtain a shape of the surrounding region of the landing point on the basis of the obtained image. The circuitry is configured to measure an above-air wind direction and an above-air wind velocity. The above-air wind direction is a wind direction in air above the landing point. The above-air wind velocity is a wind velocity in the air above the landing point. The circuitry is configured to calculate a landing-point wind direction and a landing-point wind velocity on the basis of the obtained shape of the surrounding region of the landing point, the measured above-air wind direction, and the measured above-air wind velocity. The landing-point wind direction is a wind direction at the landing point. The landing-point wind velocity is a wind velocity at the landing point.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
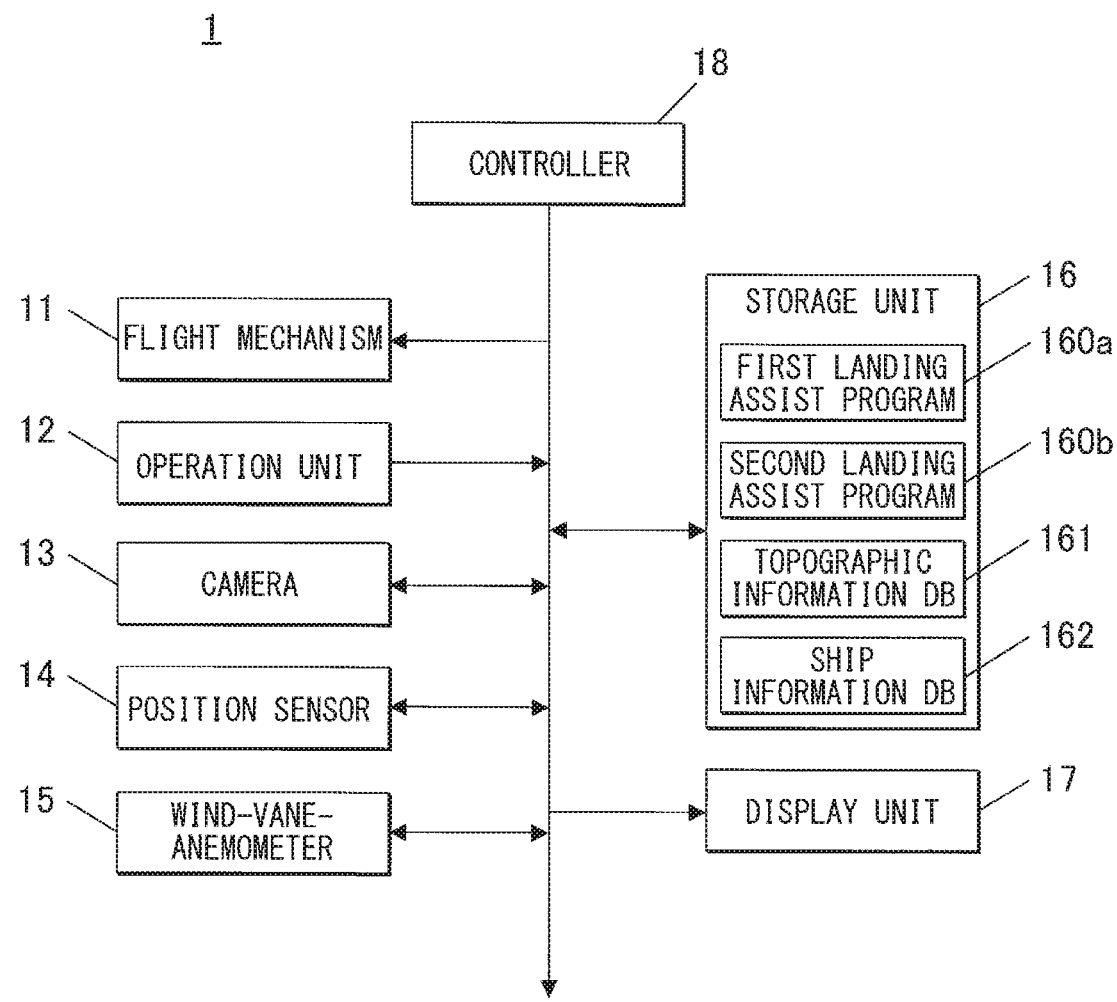
FIG. 1 is a block diagram illustrating an example of a schematic configuration of a rotary-wing aircraft according to one embodiment of the technology.

In the following, a description is given of one example embodiment of a case of applying one embodiment of the technology to a rotary-wing aircraft, with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a dimension of each of the elements, a size of each of the elements, a ratio between the elements, relative positional relationship between the elements, a material of each of the elements, and any other specific numerical value are illustrative only and not to be construed as limiting to the technology unless being specified. Further, elements in the following example embodiments which are not recited in a most-generic independent claim of the disclosure are optional and may be provided on an as-needed basis. Throughout the present specification and the drawings, elements substantially the same as or equivalent to each other are denoted with the same numerals to avoid any redundant description. Elements not directly related to one embodiment of the technology may not be illustrated.

The technique disclosed in JP-B No. 6176717 uses past flight data to obtain data of a wind direction and a wind velocity. Therefore, prediction accuracy of the wind direction and the wind velocity at a landing point may not be high.

It is desirable to provide an aircraft landing assist apparatus, an aircraft landing assist method, and a non-transitory storage medium including an aircraft landing assist program that enable estimation of a wind direction and a wind velocity at a landing point with higher accuracy.

[Configuration of Rotary-wing Aircraft]

First, a configuration of a rotary-wing aircraft 1 according to one example embodiment of the technology will be described.

FIG. 1 is a block diagram illustrating a schematic configuration of the rotary-wing aircraft 1.

The rotary-wing aircraft 1 according to one example embodiment may be configured to land safely by estimating conditions of wind at a landing point, for example, even though it is difficult to directly measure the wind at the landing point.

In a specific but non-limiting example, as illustrated in FIG. 1, the rotary-wing aircraft 1 may include a flight mechanism 11, an operation unit 12, a camera 13, a position sensor 14, a wind-vane-anemometer 15, a storage unit 16, a display unit 17, and a controller 18.

Among the above-described components, the flight mechanism 11 may make the rotary-wing aircraft 1 fly and may include devices such as an engine that generates propulsive force.

The operation unit 12 may include devices to be operated by a pilot such as a control stick or various kinds of operation keys. The operation unit 12 may output, to the controller 18, a signal corresponding to an operated state of the devices such as the control stick or each of the various kinds of the operation keys. The camera 13 may obtain an image of outside of the rotary-wing aircraft 1.

The camera 13 is not specifically limited as long as the camera 13 is able to obtain an image from which, for example, a landform or a shape of a structure is recognizable. In one non-limiting example, the camera 13 may include an optical sensor.

The position sensor 14 may obtain position information of the rotary-wing aircraft 1. The position sensor 14 in one example embodiment of the technology may include a global positioning system (GPS) receiver that is able to perform positioning using the GPS.

The wind-vane-anemometer 15 may measure a wind direction and a wind velocity of wind that blows against the rotary-wing aircraft 1.

The storage unit 16 may be a memory that holds a program, data, etc. used to achieve various types of operation of the rotary-wing aircraft 1 and that serves as a workspace. The storage unit 16 in one example embodiment may hold a first landing assist program 160a and a second landing assist program 160b.

The first landing assist program 160a may make the controller 18 execute a first landing assist process. The first landing assist process may be executed in the case of landing on a landing point on ground side. Details of the first landing assist process will be described later. The second landing assist program 160b may make the controller 18 execute a second landing assist process. The second landing assist process may be executed in the case of landing on a ship. Details of the second landing assist process will be described later.

The storage unit 16 may include a topographic information database (DB) 161 and a ship information database (DB) 162.

The topographic information database 161 may hold three-dimensional topographic information of factors that can influence a wind condition. The three-dimensional topographic information may include information of, for example but not limited to, constructions.

The ship information database 162 may hold various kinds of information relating to a plurality of ships. It may be sufficient that the various kinds of information include at least information of the shape of a ship that is planned to be landed by the rotary-wing aircraft 1.

The display unit 17 may include a display, which is not illustrated in the drawing, and may display information such as a result of calculation performed by the controller 18. The display unit 17 may also include a speaker, which is not illustrated in the drawing, and may also be able to inform by sound.

The controller 18 may perform central control of each unit of the rotary-wing aircraft 1. In a specific but non-limiting example, the controller 18 may control the flight of the rotary-wing aircraft 1 by driving the flight mechanism 11 on the basis of a signal from the operation unit 12, and the controller 18 may also control operation of the camera 13 or other devices. The controller 18 may also expand the program stored in the storage unit 16 and may execute various kinds of processes in association with the expanded program.

[Landing Operation of Rotary-wing Aircraft]

A description is given below of operation of the rotary-wing aircraft 1 performed upon landing.

[Situation of Landing on Heliport of Roof of Building]

First, landing operation in a case where the rotary-wing aircraft 1 lands on a heliport of a roof of a building is described.

Figure 2:
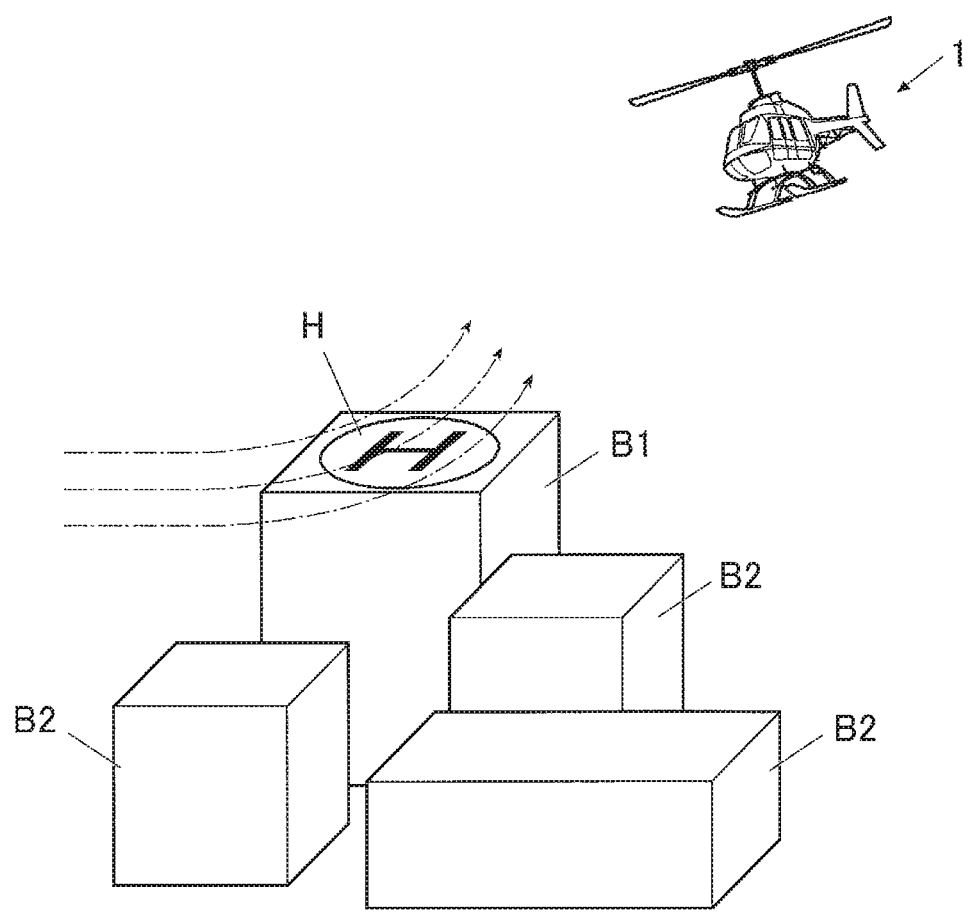
FIG. 2 is a diagram illustrating an example of a rotary-wing aircraft about to land on a heliport of a roof of a building.
Figure 3:
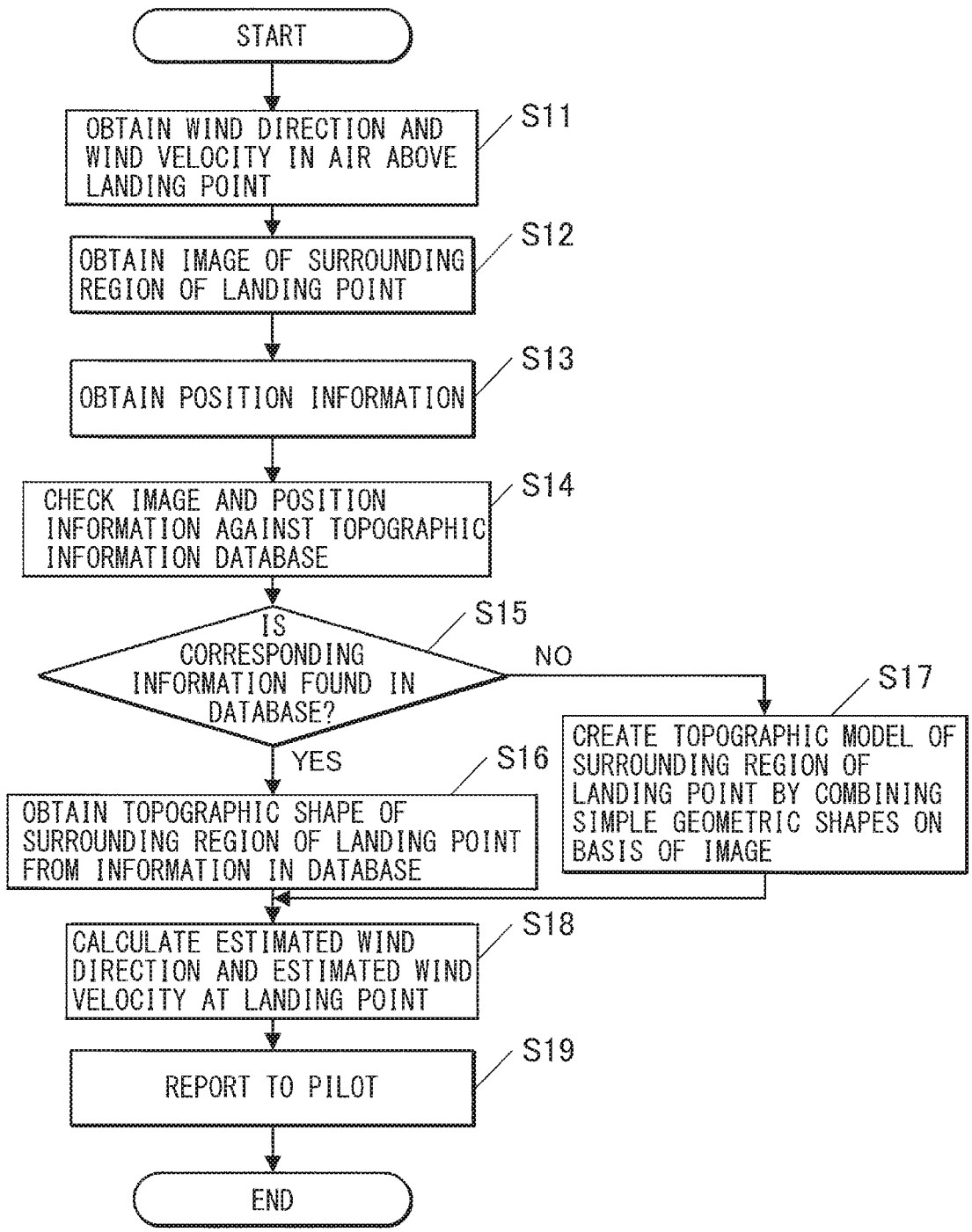
FIG. 3 is a flowchart illustrating an example of a flow of a first landing assist process according to one embodiment of the technology.

FIG. 2 illustrates the rotary-wing aircraft 1 being about to land on a heliport of a roof of a building. FIG. 3 is a flowchart illustrating a flow of the first landing assist process that is executed in landing on a heliport of a roof of a building.

FIG. 2 illustrates a building B1 having a heliport H on its roof. The building B1 is surrounded by a plurality of other buildings B2. Therefore, it is anticipated that an interfering wind, such as a building-induced irregular wind, is generated at the time of landing.

The first landing assist process may involve estimation of a wind condition at a landing point, notification of the estimated wind condition to a pilot, and providing information related to a landing method in landing on the landing point. The landing point may be a point that is fixed on the ground side, such as the heliport H. The first landing assist process may be executed by the controller 18. The controller 18 may read the first landing assist program 160a from the storage unit 16 and expand the first landing assist program 160a, for example, in accordance with execution operation for the first landing assist process performed by the pilot.

The description below is given of an example case where the rotary-wing aircraft 1 flies to a position in the air where the landing point or the heliport H is visually recognizable and, for example, stays thereat or therearound in the air.

As illustrated in FIG. 3, upon execution of the first landing assist process, first, the controller 18 may measure a wind direction and a wind velocity at a current position of the rotary-wing aircraft 1 in the air above the landing point, by using the wind-vane-anemometer 15 (step S11). It may be sufficient that the measurement of the wind direction and the wind velocity in this step is performed before calculation in step S18 is executed. The calculation in step S18 will be described later.

Thereafter, the controller 18 may control operation of the camera 13 to obtain image information of a surrounding region of the landing point (step S12). The "surrounding region" of the landing point may be a region, around the landing point, in which the surroundings can influence the wind condition at the landing point.

Thereafter, the controller 18 may obtain current position information of the rotary-wing aircraft 1 by using the position sensor 14 (step S13).

Thereafter, the controller 18 may check, against the topographic information database 161, the image information of the surrounding region of the landing point obtained in step S12, and the position information obtained in step S13 (step S14).

The controller 18 may determine whether topographic information corresponding to the image information of the surrounding region of the landing point obtained in step S12 and the position information obtained in step S13 is found in the topographic information database 161 (step S15). In a case where the corresponding topographic information is found (step S15; YES), the controller 18 may obtain the topographic information of the surrounding region of the landing point from the information stored in the topographic information database 161 (step S16).

In contrast, in the case where no corresponding topographic information is found (step S15; NO), the controller 18 may create topographic information or a topographic model of the surrounding region of the landing point by combining simple geometric shapes on the basis of the image information of the surrounding region of the landing point, which is obtained in step S12 (step S17). That is, a topographic model that simulates constructions, such as the buildings surrounding the heliport H, may be created by combining simple three-dimensional shapes. Non-limiting examples of the simple three-dimensional shapes may include a circular columnar shape and a rectangular columnar shape.

Thereafter, the controller 18 may calculate an estimated wind direction and an estimated wind velocity at the landing point on the basis of the wind direction and the wind velocity at the current position, which are obtained in step S11, as well as the topographic information of the surrounding region of the landing point obtained in step S16 or the topographic model of the surrounding region of the landing point obtained in S17 (step S18). This calculation may be performed by using a computational fluid dynamics (CFD) analysis program or a simple calculation model.

Thereafter, the controller 18 may report a result of the calculation performed in step S18 to the pilot, and as necessary, the controller 18 may provide information related to the landing method (step S19).

For example, the controller 18 may display the result of the calculation on the display unit 17, and in this condition, the controller 18 may guide the pilot to an approaching direction to enable the rotary-wing aircraft 1 to approach the landing point from downwind side in a case where the estimated wind velocity is relatively high. For example, the controller 18 may display the calculation result on the display unit 17, and in this condition, the controller 18 may warn the pilot to suspend approaching the landing point in a case where the wind is so strong that the flight for approaching is difficult to continue.

In a case of using an unmanned aircraft as the rotary-wing aircraft 1, it may be sufficient that the rotary-wing aircraft 1 is controlled to fly along a calculated appropriate approach route from the current position to the landing point. The appropriate approach route may enable, for example, the rotary-wing aircraft 1 to land from downwind side through a course in which wind is expected not to vary greatly.

After the rotary-wing aircraft 1 lands on the heliport H of the landing point, the controller 18 may end the first landing assist process.

[Situation of Landing on Deck of Ship]

Next, landing operation in a case where the rotary-wing aircraft 1 lands on a deck of a ship is described.

Figure 4:
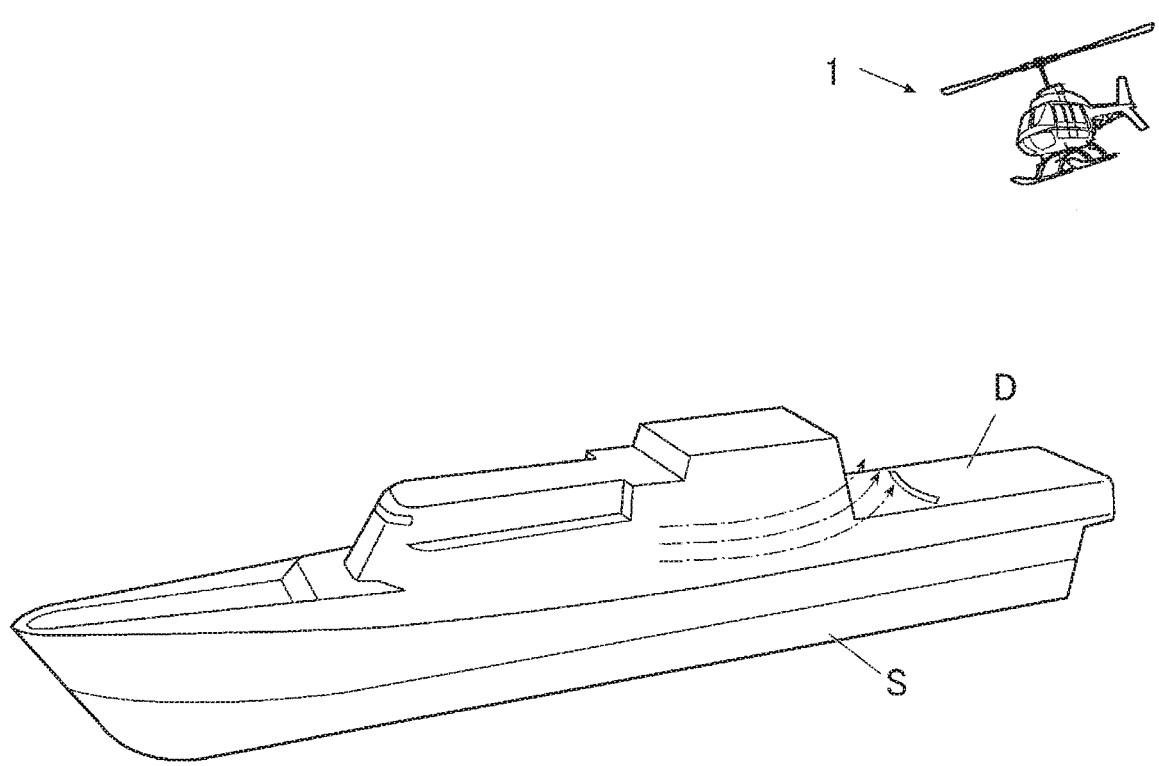
FIG. 4 is a diagram illustrating an example of a rotary-wing aircraft about to land on a deck of a ship.
Figure 5:
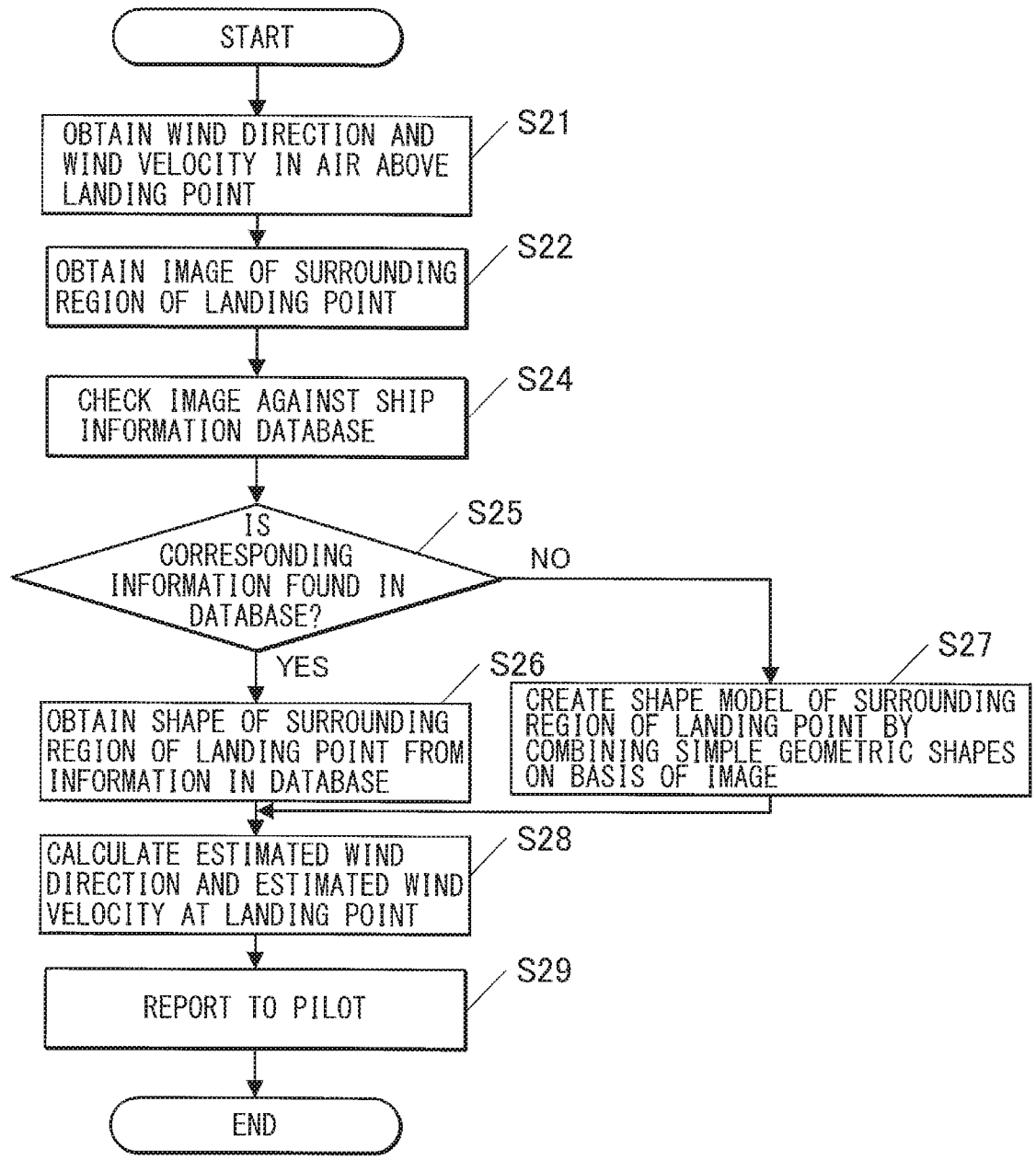
FIG. 5 is a flowchart illustrating an example of a flow of a second landing assist process according to one embodiment of the technology.

FIG. 4 illustrates the rotary-wing aircraft 1 being about to land on a deck of a ship. FIG. 5 is a flowchart illustrating a flow of a second landing assist process that is executed in landing on the deck of the ship.

FIG. 4 illustrates a ship S having a deck or a flight deck D at its stern. The description below is given of an example case where the ship S receives a sea wind at any time.

The second landing assist process may involve estimation of a wind condition at a landing point, notification of the estimated wind condition to a pilot, and providing information related to a landing method in landing on the landing point on the ship. The second landing assist process may be executed by the controller 18. The controller 18 may read the second landing assist program 160b from the storage unit 16 and expand the second landing assist program 160*b*, for example, in accordance with execution operation for the second landing assist process performed by the pilot.

The description below is given of an example case where the rotary-wing aircraft 1 flies to a position in the air where the landing point or the deck D is visually recognizable and, for example, stays thereat or therearound in the air.

As illustrated in FIG. 5, upon execution of the second landing assist process, first, the controller 18 may measure a wind direction and a wind velocity at a current position of the rotary-wing aircraft 1 in the air above the landing point, by using the wind-vane-anemometer 15 (step S21). It may be sufficient that the measurement of the wind direction and the wind velocity in this step is performed before calculation in step S28 is executed. The calculation in step S28 will be described later.

Thereafter, the controller 18 may control operation of the camera 13 to obtain image information of a surrounding region of the landing point (step S22). The "surrounding region" of the landing point may be a region, around the landing point, in which the surroundings can influence the wind condition at the landing point.

The controller 18 may check, against the ship information database 162, the image information of the surrounding region of the landing point obtained in step S22 (step S24).

The controller 18 may determine whether ship information corresponding to the image information of the surrounding region of the landing point obtained in step S22 is found in the ship information database 162 (step S25). In a case where corresponding ship information is found (step S25; YES), the controller 18 may obtain shape information, related to the corresponding ship S, of the surrounding region of the landing point from the information stored in the ship information database 162 (step S26).

In contrast, in a case where no corresponding ship information is found (step S25; NO), the controller 18 may create shape information or a shape model of the surrounding region of the landing point by combining simple geometric shapes on the basis of the image information of the surrounding region of the landing point obtained in step S22 (step S27). That is, a shape model that simulates the shape of the ship body around the deck D may be created by combining simple three-dimensional shapes. Non-limiting examples of the simple three-dimensional shape may include a circular columnar shape and a rectangular columnar shape.

Thereafter, the controller 18 may calculate an estimated wind direction and an estimated wind velocity at the landing point on the basis of the wind direction and the wind velocity at the current position, which are obtained in step S21, as well as the shape information of the surrounding region of the landing point obtained in step S26 or the shape model of the surrounding region of the landing point obtained in S27 (step S28). This calculation may be performed by using a computational fluid dynamics (CFD) analysis program or a simple calculation model.

Thereafter, the controller 18 may report a result of the calculation in step S28 to the pilot, and as necessary, the controller 18 may provide information related to the landing method (step S29).

For example, the controller 18 may display the calculation result on the display unit 17, and in this condition, the controller 18 may guide the pilot to an approaching direction to enable the rotary-wing aircraft 1 to approach the landing point from downwind side in a case where the estimated wind velocity is relatively high. For example, the controller 18 may display the result of the calculation on the display unit 17 and may thereafter warn the pilot to suspend approaching the landing point in a case where the wind is so strong that the flight for approaching is difficult to continue.

In a case of using an unmanned aircraft as the rotary-wing aircraft 1, it may be sufficient that the rotary-wing aircraft 1 is controlled to fly along a calculated appropriate approach route from the current position to the landing point. The appropriate approach route may enable, for example, the rotary-wing aircraft 1 to land from downwind side through a course in which wind is expected not to vary greatly.

After the rotary-wing aircraft 1 lands on the deck D of the landing point, the controller 18 may end the second landing assist process.

Example Effects

As described above, according to one example embodiment of the technology, an image of a surrounding region of a landing point is obtained, a shape of the surrounding region of the landing point is obtained on the basis of the obtained image, and a wind direction and a wind velocity at the landing point are calculated on the basis of the shape of the surrounding region of the landing point as well as a measured wind direction and a measured wind velocity in the air above the landing point.

Therefore, compared with an existing technique that uses past flight data to obtain data of a wind direction and a wind velocity, the wind direction and the wind velocity at the landing point are estimated with higher accuracy. This results in safer landing and reduction in burden on a pilot.

Modification Examples

It is to be noted that the technology is not limitedly applicable to the foregoing embodiments. It should be appreciated that modifications and alterations may be made by persons skilled in the art without departing from the scope as defined by the appended claims or the equivalents thereof.

For example, the foregoing example embodiment is illustrated as an example case where the estimated wind direction and the estimated wind velocity at the landing point are calculated once. However, in one example embodiment, this calculation may be performed again when the rotary-wing aircraft 1 comes closer to the landing point. In another example embodiment, this calculation may be performed at any time during the flight in approaching the landing point.

In such cases, all of the steps of the calculation flow may be repeated in a similar manner, or only the step of obtaining the wind direction and the wind velocity in step S11 or S21 and the step of obtaining the position information in step S13 may be repeated while the topographic information, the shape information, the topographic model, or the shape model is reused.

In the forgoing example embodiment, processes, such as obtaining and calculating various kinds of information, are performed only by the units mounted on the rotary-wing aircraft 1. However, processes other than obtaining the image of the surrounding region of the landing point, obtaining the position information of the rotary-wing aircraft 1, and obtaining the wind direction and the wind velocity in the air above the landing point may not be performed by the rotary-wing aircraft 1 side. In one example embodiment, an arithmetic device and a database may be provided to a ground facility, and the ground facility may perform the calculation on the basis of an image or other information that is obtained from the rotary-wing aircraft 1 via a data link and may transmit a result of the calculation to the rotary-wing aircraft 1 via the data link.

In one example embodiment, a database may be prepared in advance that includes information of the wind condition at the landing point. The result of the calculation may be corrected by using the information in the database. Alternatively or additionally, the calculation may use meteorological observation data obtained from a network.

In one example embodiment, the first landing assist process for landing on a landing point on ground side and the second landing assist process for landing on a landing point on a ship may be selected on the basis of operation other than the operation performed by a pilot. In one example embodiment, the first landing assist process for landing on a landing point on ground side and the second landing assist process for landing on a landing point on a ship may be automatically selected on the basis of, for example, position information or image information of the rotary-wing aircraft 1.

Although one embodiment of the technology is applied to the rotary-wing aircraft in the forgoing example embodiment. One embodiment of the technology may be suitably applied to a vertical takeoff and landing (VTOL) aircraft, such as the rotary-wing aircraft; however, the technology is not limited thereto. One embodiment of the technology may also be generally applicable to aircrafts other than the rotary-wing aircraft.

The controller 18 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 18 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 18 illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An aircraft landing assist apparatus comprising:
   a database includes information on three-dimensional topographies of regions;
   an image obtaining unit configured to obtain image information on an image of a surrounding region of a landing point, the surrounding region being a region around the landing point and including a three-dimensional object, the landing point being a point on which an aircraft is to land, the image being captured using an optical sensor;
   a position information obtaining unit configured to obtain position information of the aircraft;
   a shape obtaining unit configured to:
      determine, based on the image information and the position information, whether the database includes topographic information of the surrounding region of the landing point;
      when the database is determined to include the topographic information of the surrounding region of the landing point, retrieve the topographic information of the surrounding region of the landing point from the database, the topographic information including information of three-dimensional topography of the surrounding region of the landing point; and
      when the database is determined to not include the topographic information of the surrounding region of the landing point, generate a three-dimensional topographic model of the surrounding region including the three-dimensional object by combining predetermined three-dimensional shapes based on the image information of the surrounding region of the landing point;
   a measuring unit configured to measure an above-air wind direction and an above-air wind velocity, the above-air wind direction being a wind direction in air above the landing point, the above-air wind velocity being a wind velocity in the air above the landing point; and
   a calculating unit configured to calculate a landing-point wind direction at the landing point and a landing-point wind velocity at the landing point on a basis of:
      the retrieved topographic information of the surrounding region of the landing point or the generated three-dimensional topographic model of the surrounding region of the landing point;
      the above-air wind direction; and
      the above-air wind velocity.

2. The aircraft landing assist apparatus according to claim 1, wherein the calculating unit is configured to calculate the landing-point wind direction and the landing-point wind velocity by one of computational fluid dynamics analysis and a simple calculation model, on the basis of the retrieved topographic information of the surrounding region of the landing point or the generated three-dimensional topographic model of the surrounding region of the landing point, the above-air wind direction, and the above-air wind velocity.

3. The aircraft landing assist apparatus according to claim 2,
   wherein the database storing shape information of a plurality of ships,
   wherein the landing point is on a deck of a ship, and
   wherein the retrieved topographic information of the surrounding region of the landing point includes shapes of the ships.

4. The aircraft landing assist apparatus according to claim 2, wherein the aircraft landing assist apparatus is configured to warn a pilot of difficulty in approaching the landing point in a case where the calculated landing-point wind direction and the calculated landing-point wind velocity satisfy a predetermined condition.

5. The aircraft landing assist apparatus according to claim 2, wherein
   the aircraft comprises an unmanned aircraft, and the aircraft landing assist apparatus is configured to calculate a route approaching the landing point on a basis of the landing-point wind direction calculated by the calculating unit and the landing-point wind velocity calculated by the calculating unit, to thereby control the unmanned aircraft to fly along the route.

6. The aircraft landing assist apparatus according to claim 2, wherein the aircraft comprises a rotary-wing aircraft.

7. The aircraft landing assist apparatus according to claim 1, wherein the database includes shape information of a plurality of ships,
wherein the landing point is on a deck of a ship, and
wherein the retrieved topographic information of the surrounding region of the landing point includes shapes of the ships.

8. The aircraft landing assist apparatus according to claim 1, wherein the aircraft landing assist apparatus is configured to warn a pilot of difficulty in approaching the landing point in a case where the calculated landing-point wind direction and the calculated landing-point wind velocity satisfy a predetermined condition.

9. The aircraft landing assist apparatus according to claim 1, wherein
the aircraft comprises an unmanned aircraft, and
the aircraft landing assist apparatus is configured to calculate a route approaching the landing point on a basis of the landing-point wind direction calculated by the calculating unit and the landing-point wind velocity calculated by the calculating unit, to thereby control the unmanned aircraft to fly along the route.

10. The aircraft landing assist apparatus according to claim 1, wherein the aircraft comprises a rotary-wing aircraft.

11. The aircraft landing assist apparatus according to claim 1, wherein the predetermined three-dimensional shapes include at least one of a circular columnar shape and a rectangular columnar shape.

12. An aircraft landing assist method comprising:
obtaining image information on an image of a surrounding region of a landing point, the surrounding region being a region around the landing point and including a three-dimensional object, the landing point being a point on which an aircraft is to land, the image being captured using an optical sensor;
determining, based on the image information and position information of the aircraft, whether a database includes topographic information of the surrounding region of the landing point;
when the database is determined to include the topographic information of the surrounding region of the landing point, retrieving the topographic information of the surrounding region of the landing point from the database, the topographic information including information of three-dimensional topography of the surrounding region of the landing point;
when the database is determined to not include the topographic information of the surrounding region of the landing point, generating a three-dimensional topographic model of the surrounding region including the three-dimensional object by combining predetermined three-dimensional shapes based on the image information of the surrounding region of the landing point;
measuring an above-air wind direction and an above-air wind velocity, the above-air wind direction being a wind direction in air above the landing point, the above-air wind velocity being a wind velocity in the air above the landing point; and
calculating a landing-point wind direction at the landing point and a landing-point wind velocity at the landing point on a basis of:
the retrieved topographic information of the surrounding region of the landing point or the generated three-dimensional topographic model of the surrounding region of the landing point;
the measured above-air wind direction; and
the measured above-air wind velocity.

13. The aircraft landing assist apparatus according to claim 12, wherein the predetermined three-dimensional shapes include at least one of a circular columnar shape and a rectangular columnar shape.

14. A non-transitory storage medium that includes an aircraft landing assist program embodied therein, the aircraft landing assist program causing, when executed by an information processor, the information processor to implement a method, the method comprising:
obtaining image information on an image of a surrounding region of a landing point, the surrounding region being a region around the landing point and including a three-dimensional object, the landing point being a point on which an aircraft is to land, the image being captured using an optical sensor;
determining, based on the image information and position information of the aircraft, whether a database includes topographic information of the surrounding region of the landing point;
when the database is determined to include the topographic information of the surrounding region of the landing point, retrieving the topographic information of the surrounding region of the landing point from the database, the topographic information including information of three-dimensional topography of the surrounding region of the landing point; and
when the database is determined to not include the topographic information of the surrounding region of the landing point, generating a three-dimensional topographic model of the surrounding region including the three-dimensional object by combining predetermined three-dimensional shapes based on the image information of the surrounding region of the landing point
measuring an above-air wind direction and an above-air wind velocity, the above-air wind direction being a wind direction in air above the landing point, the above-air wind velocity being a wind velocity in the air above the landing point; and
calculating a landing-point wind direction at the landing point and a landing-point wind velocity at the landing point on a basis of:
the retrieved topographic information of the surrounding region of the landing point or the generated three-dimensional topographic model of the surrounding region of the landing point;
the measured above-air wind direction; and
the measured above-air wind velocity.

15. The aircraft landing assist apparatus according to claim 14, wherein the predetermined three-dimensional shapes include at least one of a circular columnar shape and a rectangular columnar shape.

16. An aircraft landing assist apparatus comprising a database storing information on topographies of regions; and
circuitry configured to:
obtain image information on an image of a surrounding region of a landing point, the surrounding region being a region around the landing point and including a three-dimensional object, the landing point being a point on which an aircraft is to land the image being captured using an optical sensor;

determine, based on the image information and position information of the aircraft, whether the database includes topographic information of the surrounding region of the landing point;

when the database is determined to include the topographic information of the surrounding region of the landing point, retrieve the topographic information of the surrounding region of the landing point from the database, the topographic information including information of three-dimensional topography of the surrounding region of the landing point; and when the database is determined to not include the topographic information of the surrounding region of the landing point, generate a three-dimensional topographic model of the surrounding region including the three-dimensional object by combining predetermined three-dimensional shapes based on the image information of the surrounding region of the landing point;

measure an above-air wind direction and an above-air wind velocity, the above-air wind direction being a wind direction in air above the landing point, the above-air wind velocity being a wind velocity in the air above the landing point; and calculate a landing-point wind direction at the landing point and a landing-point wind velocity at the landing point on a basis of:
  the retrieved topographic information of the surrounding region of the landing point or the generated three-dimensional topographic model of the surrounding region of the landing point;
  the measured above-air wind direction; and
  the measured above-air wind velocity.

17. The aircraft landing assist apparatus according to claim 16, wherein the predetermined three-dimensional shapes include at least one of a circular columnar shape and a rectangular columnar shape.

* * * * *